United States Patent [19]

Klassen

[11] 4,248,328
[45] Feb. 3, 1981

[54] SLIDING CALIPER DISC BRAKE

[75] Inventor: Horst W. Klassen, St. Sebastian, Fed. Rep. of Germany

[73] Assignee: Girling Limited, Birmingham, England

[21] Appl. No.: 38,822

[22] Filed: May 14, 1979

[30] Foreign Application Priority Data

May 24, 1978 [GB] United Kingdom ............... 21987/78

[51] Int. Cl.³ ............................................. F16D 65/00
[52] U.S. Cl. .................................... 188/73.3; 188/73.5
[58] Field of Search ............................. 188/73.3–73.6, 188/73.1, 71.1, 250 E, 250 G, 250 B, 251 R, 251 A, 251 M, 72.4

[56] References Cited

U.S. PATENT DOCUMENTS 2,989,153  6/1961  Boulet ............................. 188/73.1 X

FOREIGN PATENT DOCUMENTS 1524827  9/1978  United Kingdom .................... 188/73.1

Primary Examiner—Douglas C. Butler
Attorney, Agent, or Firm—Scrivener, Clarke, Scrivener and Johnson

[57] ABSTRACT

The present invention is concerned with a sliding caliper disc brake having a torque member and a caliper incorporating at least one hydraulic actuator. The caliper is attached to the torque member for sliding movement relative thereto and is arranged to act on a pair of friction pad assemblies. Mutually abutting surfaces of the caliper and a friction pad assembly are such that one of the surfaces is roughened while the other of the surfaces is formed of a material which is relatively soft in relation to one of the surfaces. Thus, under braking, the roughened surface is caused to impress itself into the softer surface so as to restrain rotation of the friction pad assembly relative to the caliper.

9 Claims, 4 Drawing Figures

SLIDING CALIPER DISC BRAKE

The present invention relates to a sliding caliper disc brake of the kind in which drag forces from a friction pad assembly of the brake are transmitted directly to a torque member of the brake.

In such brakes the torque member provides a recess for a friction pad assembly to move axially of the disc during operation of the brake; and it has been usual practice to maintain a small working clearance between the friction pad assembly and the recess. Usually ears or lugs on a back plate of the friction pad assembly engage with abutment surfaces on the torque member, and an anti-rattle spring acts to hold the friction pad assembly in contact with the torque member. A known disadvantage of using a small clearance is that corrosion or dirt which builds-up on the abutment surfaces increases the sliding resistance of the brake pad assembly during brake application and may lead to complete seizure of the friction pad assembly in the torque member. To avoid this problem, it is known to employ a wider clearance, but this gives rise to a condition in which the friction pad assembly can move within the recess. This in turn gives rise to a problem after assembly of the brake with new friction pads; the problem being the generation of noise termed "clack" on release of the brakes. This noise has been traced to the fact that a friction pad assembly may part company with its abutment surface during application of the brake and be quickly returned into contact with the abutment surface to cause the noise on release of the brake. Thus, when increased clearance is provided in conjunction with unbedded pads (where the coefficient of friction may not be uniform across the pad) the drag force does not necessarily pass through the centre of pressure, so there is a tendency for the pad to pivot about one lug so lifting the second lug off the respective abutment surface during brake application; the spring returning the pad to the abutment surface on release of the brake. It is evident from this that the generation of "clack" is due to rotation of the brake pad assembly during application of the brake. Increasing the force of the anti-rattle spring may enable rotation of the brake pad assembly to be prevented, but it would involve increasing the sliding friction of the pad, which is undesirable.

It is here mentioned that in a sliding caliper disc brake, one friction pad assembly is directly operated by an hydraulic actuator in the caliper and the other friction pad assembly is indirectly operated by a so-called fist of the caliper as a result of the reactive operation of the hydraulic actuator, and the above outlined problem usually arises with the indirectly operated friction pad assembly, rotation of the directly operated friction pad assembly being prevented by engagement with the hydraulic actuator. In instances where this is not so the problem also appears with the directly operated friction pad assembly.

It is an aim of the present invention to provide a sliding caliper disc brake in which a friction pad assembly is restrained from rotation under the action of drag forces arising from braking, regardless of the clearance used between the friction pad assembly and the torque member and without increasing the spring force of the anti-rattle spring.

According to the present invention there is provided a sliding caliper disc brake comprising a torque member and a caliper incorporating at least one hydraulic actuator, the caliper being attached to the torque member for sliding movement relative thereto and arranged to act on a pair of friction pad assemblies, the mutually abutting surfaces of the caliper and a friction pad assembly being such that one of the surfaces is roughened while the other of the surfaces is formed of a material which is relatively soft in relation to the said one of said surfaces. Thus the roughened surface is caused to impress itself into the softer surface so as to restrain rotation of the friction pad assembly relative to the caliper, under braking.

Preferably, the roughened surface is provided by means of a series of grooves or raised lands preferably of arcuate form; and it may advantageously be provided on the fist of the caliper i.e. on the surface of the caliper which contacts the indirectly operated friction pad assembly. The relatively soft surface may be provided by a material known as "wolverine" in the form of a coating of the repsective member. Thus, in the case where the roughened surfaces is provided on the fist of the caliper, the indirectly operated friction pad assembly on the side thereof contacted by the fist of the caliper, may be coated with wolverine.

In an alternative embodiment of the present invention the soft surface e.g. the wolverine coating, is provided on the fist of the caliper and the roughened surface is provided on the backing plate of the indirectly operated friction pad assembly.

In addition or alternatively the present invention may be applied to the directly operated friction pad assembly, the mutually abutting surfaces being suitably adapted.

The present invention will now be described, by way of example, with reference to the accompanying drawings, in which.

Figure 1:
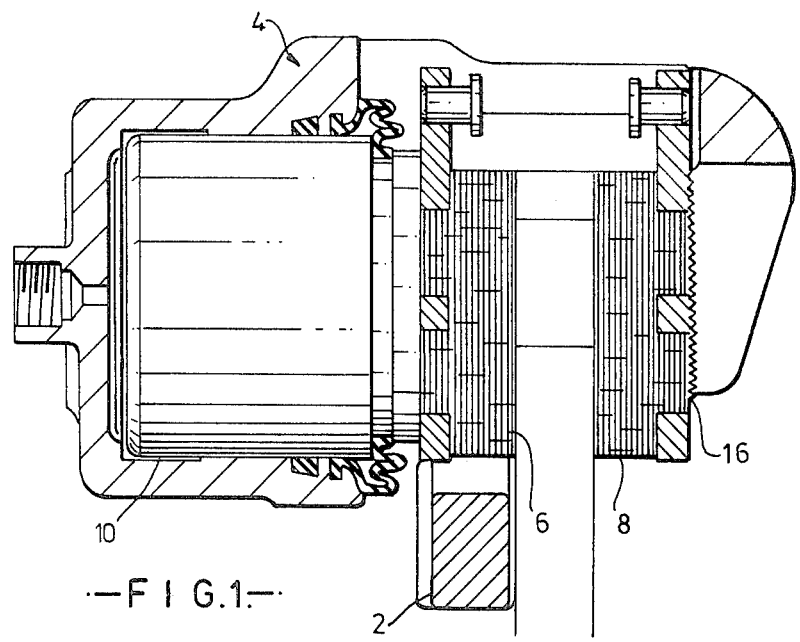
FIG. 1 is a sectional side elevation of one embodiment of a sliding caliper disc brake according to the present invention.

Since the disc brake shown in FIG. 1 is generally of a conventional structure, it will be described only in so far as it is necessary to provide an understanding of the present invention.

Figure 3:
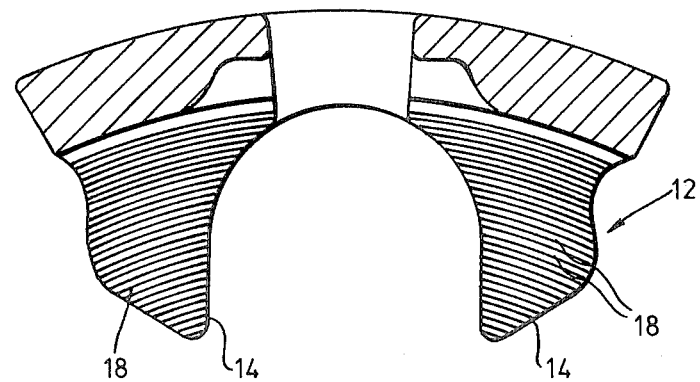
FIG. 3 is a section through the caliper shown in FIG. 2 taken to show the fist of the caliper.

Referring to the drawings, the brake comprises a torque member 2 on which a caliper 4 is mounted for sliding movement on the torque member in the axial direction of the disc (not shown). The brake further comprises two friction pad assemblies, 6 and 8, and an actuator 10 which directly acts on the friction pad assembly 76 in operation of the brake to apply that friction pad assembly to the disc. The other friction pad assembly 8, is applied to the disc by reactive sliding of the caliper on the torque member on the operation of the actuator; and, for this purpose, the caliper is formed with a fist 12 the inwardly directed surface 14 of which makes contact with the outwardly directed surface of the indirectly operated friction pad assembly. The inwardly directed surface 14 of the caliper is roughened and, as may be most clearly seen from FIG. 3, the roughening takes the form of a plurality of concentric grooves 18. The opposing surface 16 of the indirectly operated friction pad assembly is coated with the material "wolverine", the wolverine coating providing a surface which is soft relative to the roughened surface of the fist of the caliper. As a result, on operation of the brake the roughened surface of the fist of the caliper impresses itself into the relative soft facing surface of the indirectly operated friction pad assembly and has the effect of preventing rotation of the friction pad assembly relative to the caliper.

Figure 2:
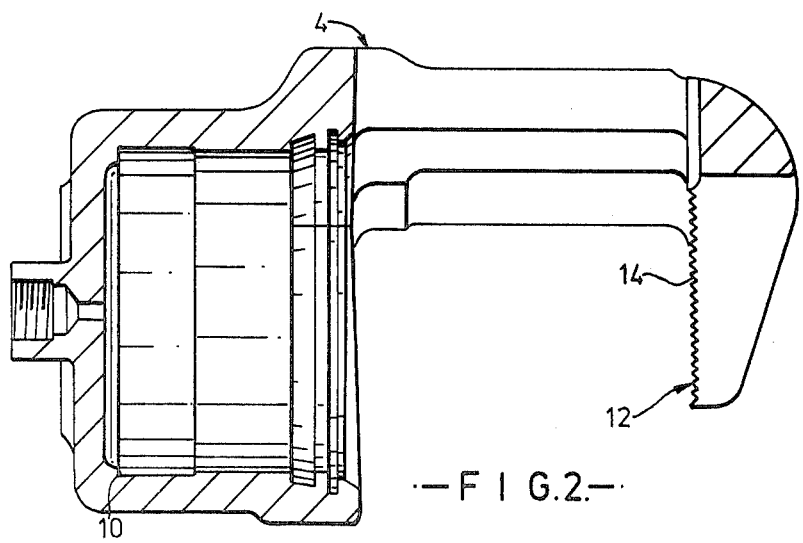
FIG. 2 is a sectional side elevation of the caliper of the brake shown in FIG. 1.
Figure 4:
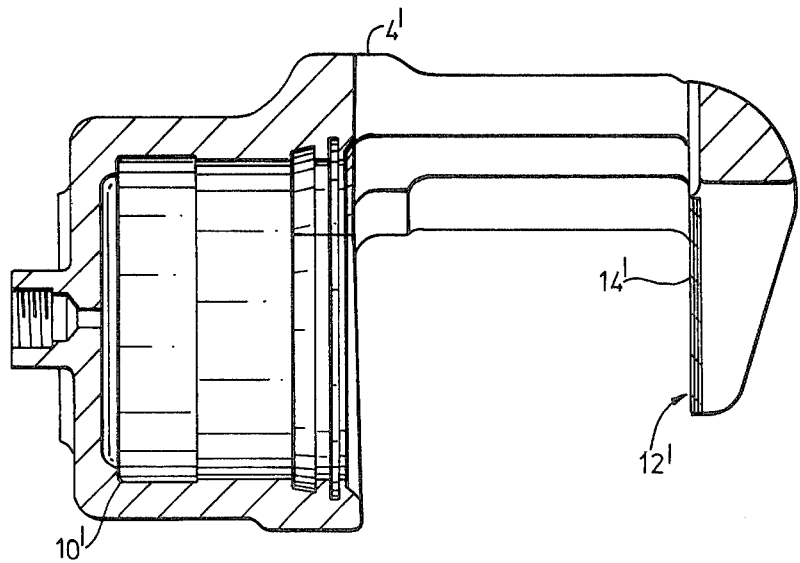
FIG. 4 is a sectional view of an alternative caliper form.

FIG. 4 shows a caliper of a further embodiment of disc brake according to the present invention. In this embodiment the caliper 4' has an actuator 10' and a fist 12'. Whilst in the embodiment of FIGS. 1 to 3, the inwardly directed surface 14 of fist 12 is roughened, in the embodiment of FIG. 4 the inwardly directed surface 14' of fist 12' is coated with wolverine, the backing plate of the indirectly operated friction pad assembly (not shown) being roughened. Thus the required grip to prevent rotation of the friction pad assembly is obtained.

Although the invention has been described above with reference to an indirectly operated friction pad assembly, it will be evident that the present invention could also, either additionally or alternatively, be applied to a directly operated friction pad assembly.

What I claim is:

1. A sliding caliper disc brake comprising a torque member, a caliper and a pair of friction pad assemblies, at least one hydraulic actuator being incorporated in the caliper, the caliper being attached to the torque member for sliding movement relative thereto and being arranged to act on the friction pad assemblies, mutually abutting surfaces of the caliper and a friction pad assembly being such that one of the surfaces is roughened while the other of the surfaces is formed of a material which is relatively soft in relation to the said one of said surfaces, whereby under braking the roughened surface is caused to impress itself into the softer surface so as to restrain rotation of the friction pad assembly relative to the caliper.

2. A sliding caliper disc brake according to claim 1, wherein the roughened surface is provided by a series of grooves.

3. A sliding caliper disc brake according to claim 2, wherein the grooves are of arcuate form.

4. A sliding caliper disc brake according to claim 3, wherein the grooves are concentrically arranged.

5. A sliding caliper disc brake according to claim 2 wherein the grooves extend generally transversely relative to the axis of disc rotation.

6. A sliding caliper disc brake according to claim 1, wherein the said other of the surfaces is formed by a coating of wolverine.

7. A sliding caliper disc brake according to claim 1, wherein the roughened surface is provided on the caliper, the softer surface being provided on a friction pad assembly.

8. A sliding caliper disc brake according to claim 1, wherein the softer surface is provided on the caliper.

9. A sliding caliper disc brake according to claim 1 wherein said friction pad assembly slideably engages abutment surfaces on the torque member and transmits drag forces directly thereto, said impressed roughened surface, in addition, restraining rotation of said friction pad assembly relative to said torque member.

* * * * *